(12) United States Patent
Chesser et al.

(10) Patent No.: US 7,679,366 B2
(45) Date of Patent: *Mar. 16, 2010

(54) SELECTABLE TAP INDUCTION COIL

(75) Inventors: Scott S. Chesser, Richmond, TX (US);
Richard D. Ward, LaPorte, TX (US);
Bulent Finci, Sugar Land, TX (US);
Andrei I. Davydychev, Sugar Land, TX (US); William B. Vandermeer,
Houston, TX (US); John F. Hunka,
Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/177,990

(22) Filed: Jul. 23, 2008

(65) Prior Publication Data

US 2008/0278170 A1    Nov. 13, 2008

Related U.S. Application Data

(63) Continuation of application No. 11/307,673, filed on Feb. 16, 2006, now Pat. No. 7,417,436.

(51) Int. Cl.
*G01V 3/28* (2006.01)
*G01V 3/10* (2006.01)
(52) U.S. Cl. .................. 324/339; 324/334; 324/333
(58) Field of Classification Search .......... 324/332, 324/333, 334, 337, 338, 339, 344; 702/6, 702/7, 9, 11
See application file for complete search history.

(56) References Cited

U.S. PATENT DOCUMENTS

| | | | |
|---|---|---|---|
| 4,264,862 A | 4/1981 | Koelle et al. | |
| 4,510,428 A * | 4/1985 | Dunne | 318/568.16 |
| 5,065,099 A | 11/1991 | Sinclair et al. | |
| 5,157,605 A | 10/1992 | Chandler et al. | |
| 5,265,607 A * | 11/1993 | Moberg | 600/383 |
| 5,402,068 A | 3/1995 | Meador et al. | |
| 5,668,475 A | 9/1997 | Orban et al. | |
| 5,687,652 A * | 11/1997 | Ruma | 108/57.25 |
| 5,905,379 A | 5/1999 | Orban et al. | |
| 6,534,985 B2 | 3/2003 | Holladay, III et al. | |
| 6,557,794 B2 | 5/2003 | Rosthal et al. | |
| 6,586,939 B1 | 7/2003 | Fanini et al. | |
| 6,597,993 B2 | 7/2003 | Strickland et al. | |
| 6,600,995 B2 | 7/2003 | Strickland et al. | |
| 6,603,312 B2 | 8/2003 | Sinclair | |
| 6,690,170 B2 | 2/2004 | Homan et al. | |
| 6,734,675 B2 | 5/2004 | Fanini et al. | |
| 6,934,635 B2 | 8/2005 | Kennedy | |
| 2003/0004647 A1 | 1/2003 | Sinclair et al. | |

(Continued)

*Primary Examiner*—Kenneth J Whittington
(74) *Attorney, Agent, or Firm*—Darla P. Fonseca; Jaime Castano

(57) ABSTRACT

An electromagnetic logging tool includes a support configured for disposal in a well; at least one antenna mounted on the support; and a plurality of coils mounted on the support proximate the at least one antenna, wherein the plurality of the coils are configured for selective connection with the at least one antenna. A methods for balancing an induction array on an electromagnetic logging tool includes measuring a mutual coupling between a transmitter and a receiver on the electromagnetic logging tool; and selectively connecting a subset of a plurality of coils on the electromagnetic logging tool to the transmitter or the receiver based on the measured mutual coupling.

9 Claims, 10 Drawing Sheets

U.S. PATENT DOCUMENTS

| | | |
|---|---|---|
| 2004/0207403 A1 | 10/2004 | Fanini et al. |
| 2005/0030037 A1 | 2/2005 | Fanini et al. |
| 2005/0030059 A1 | 2/2005 | Tabarovsky et al. |
| 2005/0093547 A1 | 5/2005 | Xiao et al. |
| 2005/0127917 A1 | 6/2005 | Barber |

* cited by examiner

SCHEMATIC

SELECTABLE TAP INDUCTION COIL

CROSS-REFERENCE TO RELATED APPLICATIONS

The present application claims priority of U.S. Provisional Patent Application Ser. No. 60/657,174 filed on Feb. 28, 2005. The Provisional Application is incorporated by reference in its entirety. This application is related to U.S. Application, entitled "Extra Bucking Coils As An Alternative Way To Balance Induction Arrays", filed concurrently with this document and assigned to the present assignee.

BACKGROUND OF INVENTION

1. Field of the Invention

The invention relates generally to electromagnetic (EM) well logging. In particular, embodiments of the present invention relate to methods and apparatus for balancing induction array tools.

2. Background Art

During the exploration and production of oil and gas, many well logging techniques are deployed to log data of the geological formations. The data contain information that can be used to locate subsurface hydrocarbon reservoirs and to determine types and quantities of subsurface hydrocarbons. In such logging processes, a tool may be lowered into a borehole traversing a subsurface formation, either after the well has been drilled or during the drilling process. A typical logging tool includes a "sonde", that emits, for example, acoustic or EM waves to interact with the surrounding formation. The signals produced from such interactions are then detected and measured by one or more sensors on the instrument. By processing the detected signals, a profile or log of the formation properties can be obtained.

Logging techniques known in the art include "wireline" logging, logging-while-drilling (LWD), measurement-while-drilling (MWD), and logging-while-tripping (LWT). Wireline logging involves lowering an instrument into an already-drilled borehole at the end of an electrical cable to obtain measurements as the instrument is moved along the borehole. LWD and MWD involve disposing an instrument in a drilling assembly for use while a borehole is being drilled through earth formations. LWT involves disposing sources or sensors within the drill string to obtain measurements while the string is being withdrawn from the borehole.

FIG. 1 shows a typical LWD or MWD setup having a drilling rig with a drill string carrying a downhole logging tool in a borehole. The rotary drilling rig shown in FIG. 1 comprises a mast 1 rising above the ground 2 and is fitted with a lifting gear 3. The lifting gear 3 has a crown block 7 fixed to the top of the mast 1, a vertically traveling block 8 with a hook 9 attached, a cable 10 passing around blocks 7 and 8 to form on one side a dead line 10a anchored to a fixed point 11 and on the other side an active line 10b that winds round the drum of a winch 12. A drill string 4 formed of several segments of hollow drilling pipes connected end-to-end is suspended from the hook 9 by means of a swivel 13, which is linked by a hose 14 to a mud pump 15. The mud pump 15 pumps drilling mud into the well 6, via the hollow pipes of the drill string 4 and out of the bit 5 to float the rock cuttings out of the well 6. The drilling mud may be drawn from a mud pit 16, which may also be fed with surplus mud from the well 6. The drill string 4 may be elevated by turning the lifting gear 3 with the winch 12. When raising or lowering drill pipes, the drill string 4 needs to be temporarily unhooked from the lifting gear 3, during which the weight of the string 4 is supported by wedges 17. The wedges 17 are anchored in a conical recess 18 in a rotating table 19 that is mounted on a platform 20. The lower portion of the drill string 4 may include one or more instruments 30 for investigating downhole drilling conditions or for investigating the properties of the geological formations. In the case of sonic logging, the instrument 30 may include at least one transmitter and a plurality of receivers.

Variations in the height h of the traveling block 8 during the raising cycle of the drill string operations are measured by means of a sensor 23 which may be an angle-of-rotation sensor coupled to the faster pulley of the crown block 7. The weight applied to the hook 9 may also be measured by means of a strain gauge 24 inserted into the dead line 10a of the cable 10 to measure its tension. Sensors 23 and 24 are connected by lines 25 and 26 to a processing unit 27 having a clock incorporated therein. A recorder 28 is connected to the processing unit 27, which is preferably a computer. In addition, the downhole tool 30 may include a processing unit 30a. The downhole processing unit 30a and/or the surface processing unit 27, which may include a memory, may be used to perform the data analysis and determination of formation properties.

For downhole tools, EM logging tools are among the widely used. EM logging tools are implemented with antennas that are operable as transmitters and/or receivers. The antennas are typically solenoid coils. Referring to FIG. 2, a coil 211 is shown comprising of insulated conducting wires having one or more turns wound around a support 214. During operation, the coil 211 may function as a transmitter antenna when it is energized with an alternating current or an oscillating electrical signal 212. The transmitter antenna emits EM waves through the borehole mud and into the surrounding earth formation. The coil 211 may also function as a receiver antenna that collects EM signals carrying information about the interactions between the EM waves and the mud/formation.

The coil 211 carrying a varying current 212 will produce a magnetic dipole having a magnetic moment. The strength of the magnetic moment is proportional to the electric current in the wire, the number of turns of the wire, and the area encompassed by the coil. The direction and strength of the magnetic moment can be represented by a vector 213 parallel to the longitudinal axis of the coil. In conventional induction logging instruments, the transmitter and receiver antennas are mounted with their axes aligned with the longitudinal axis of the instrument. Thus, these tools are implemented with antennas having longitudinal magnetic dipoles (LMD). When an LMD antenna is placed in a borehole and energized to transmit EM energy, the induced electric currents flow around the antenna in the borehole and in the surrounding earth formations, and no net current flows up or down the borehole.

Some EM well logging tools have tilted or transverse coils, i.e., the coil's axis is not parallel with the longitudinal axis of the support. Consequently, the antenna has a transverse or tilted magnetic dipole (TMD). The TMD configuration permits a tool to have a three-dimensional evaluation capability, such as information about resistivity anisotropy or locations and orientations of dips and faults. In addition, directional sensitivity of the data is recorded and can be used for directional drilling. Logging instruments equipped with TMD-antennas have been described in U.S. Pat. Nos. 6,147,496, 4,319,191, 5,757,191, and 5,508,616. Under certain conditions, a TMD-antenna may cause a net current to flow up or down the borehole. Some TMD-antennas are configured with multiple coils. For example, a particular TMD-antenna design includes a set of three coils, and such an antenna is known as a triaxial antenna.

In wireline applications, the antennas are typically enclosed in a housing made of tough non-conductive materials such as a laminated fiberglass material. In LWD applications, the antennas are generally encased into a metallic support so that it can withstand the hostile environment and conditions encountered during drilling. Alternatively, logging instruments may be made of composite materials, thus, providing a non-conductive structure for mounting the antennas. U.S. Pat. Nos. 6,084,052, 6,300,762, 5,988,300, 5,944,124, and UK Patent GB 2337546 disclose examples of composite-material-based instruments and tubulars for oilfield applications.

Induction logging is a well-known form of EM logging. In this type of logging, induction tools are used to produce a conductivity or resistivity profile of earth formations surrounding a borehole. U.S. Pat. Nos. 3,340,464, 3,147,429, 3,179,879, 3,056,917, and 4,472,684 disclose typical well logging tools based on induction logging.

A conventional induction logging tool or "sonde" may include a transmitter antenna and a receiver antenna. Note that the designation of a transmitter and a receiver is for clarity of illustration. One skilled in the art would appreciate that a transmitter may be used as a receiver and a receiver may also be used as a transmitter depending on the application. Each antenna may include one or more coils, and may be mounted on the same support member or on different support members, i.e., the transmitter antenna and the receiver antenna may be on different tool sections. The antennas are axially spaced from each other in the longitudinal direction of the tool.

In use, the transmitter antenna is energized with an alternating current. This generates an EM field that induces eddy currents in the earth formation surrounding the borehole. The intensity of the eddy currents is proportional to the conductivity of the formation. The EM field generated by the eddy currents, in turn, induces an electromotive force in one or more receiving coils. Phase-locked detection, amplification, and digitization of this electromotive force signal determines the amplitude and the phase of the voltage on the receiver coil. By recording and processing the receiver voltages, an evaluation of an earth formation conductivity profile can be obtained. U.S. Pat. No. 5,157,605 discloses an induction array well logging tool used to collect the voltage data.

In principle, a conductivity profile may be obtained by simply measuring the voltages on the receiver. In practice, the receiver voltages are not only affected by "true" signals traveling through the formation, but are also affected by a direct coupling between the transmitter and the receiver. It is well known that the sensitivity of measurements obtained from induction-type loggings are adversely affected by the direct transmitter-to-receiver (mutual) coupling.

Mathematically, the amplitude and phase of the received signal voltage may be expressed as $\sigma_a$ complex number (i.e., a phasor voltage). Accordingly, the apparent conductivity a, (as measured by a receiver induction array) is expressed in terms of its real and imaginary parts, $\sigma_a = \sigma_R + i\sigma_X$. The real part $\sigma_R$ represents the true signal from the earth formation, while the imaginary part $\sigma_X$ includes the direct coupling that may be several orders of magnitude larger than the value of $\sigma_R$, when the array is unbalanced. This can be seen from a well-known formula describing the conductivity measured by a two-coil (one transmitter and one receiver) array, when the transmitter is simplified as a point dipole, $$\sigma_a = \sigma_R + i\sigma_X = -\frac{2i}{\omega\mu} \frac{(1 - ikL)e^{ikL}}{L^2}, \quad (1)$$

where $\omega$ is the frequency, $\mu$ is the magnetic permeability of a (homogeneous) medium, $k^2 = i\omega\mu\sigma$, $\sigma$ is the conductivity of the medium, and L is the transmitter-receiver spacing. Defining a skin depth as $\delta = \sqrt{2/(\omega\mu\sigma)}$ (so that $k = (1+i)/\delta$) and expanding $\sigma_a$ using the powers of $L/\delta$, one obtains:

$$\sigma_R + i\sigma_X = \sigma - \frac{2i}{\omega\mu L^2} - \frac{2L\sigma}{3\delta}(1 - i) + O(L^2/\delta^2). \quad (2)$$

The first term on the right-hand side of Eq. (2) is the formation conductivity $\sigma$ of interest. The second term, $-2i/(\omega\mu L^2)$, contributes to $\sigma_X$ only. It does not depend on $\sigma$ and corresponds to the direct mutual transmitter-receiver coupling that exists in the air. An out-of-balance induction array can have a very large value of $\sigma_X$, for example, when L is small. Therefore, in order for an induction tool to achieve a high sensitivity, the induction array must be balanced to reduce the value of $\sigma_X$.

As illustrated in FIG. 3, an induction-type logging instrument typically includes a "bucking" coil 311 in the receiver 314 in order to eliminate or reduce direct coupling between the transmitter 312 and the main receiver 313. The instrument longitudinal axis is represented as a dashed line in FIG. 3. The purpose of having two receiver coils, the main coil 313 and the bucking coil 311, in a balanced configuration in the receiver 314 is to cancel the transmitter-main-coil coupling using the transmitter-bucking-coil coupling. The bucking coil 311 is placed between the transmitter 312 and the main coil 313 of the receiver 314. Practical induction arrays have always been mutually-balanced using a bucking coil. This is necessitated by the fact that the direct coupling between a transmitter and a receiver is usually several orders of magnitude stronger than the true signals, the latter being strongly attenuated when traveling through the earth formation.

The minimum configuration for a mutually-balanced array is a three-coil array as illustrated in FIG. 3, including a transmitter 312 (T), a receiver main coil 313 ($R_1$) and a receiver bucking coil 311 ($R_2$). In order to balance the array, the locations of the receiver coils ($Z_{main}$ and $Z_{buck}$) and the numbers of turns in these coils ($N_{main}$ and $N_{buck}$) are chosen such that the sum of their responses is close to zero in the air. That is, the voltages on the two receiver coils satisfy the relation: $V_{R1} + V_{R2} = 0$, in the air. Consequently, the responses from a logging operation will be the sum of the T–$R_1$ coupling responses and the T–$R_2$ coupling responses.

The mutual coupling voltage varies (in the point-dipole approximation) with $1/L^3$ (an extra power of $1/L$ coming from the $1/L$-dependence of the tool factor K).

Therefore, the balancing condition of an induction array is met when $$\frac{M_{main}}{L_{main}^3} + \frac{M_{buck}}{L_{buck}^3} = 0,$$

where $M_{main}$ and $M_{buck}$ are magnetic moments of the main and bucking coils. If all coil turns have the same geometry, then $M_{main}$ and $M_{buck}$ equal $M_0 N_{main}$ and $M_0 N_{buck}$, respectively, where $M_0$ is the magnetic moment of a single turn. Therefore, the balance condition is met when:

$$\frac{N_{main}}{L_{main}^3} + \frac{N_{buck}}{L_{buck}^3} = 0. \qquad (3)$$

To satisfy this condition, the two terms in the left side of Eq. (3) are of opposite signs. This can be achieved by winding the wires in the opposite directions for the bucking and main receiver coils. The $1/L^3$-dependence of the mutual coupling voltages implies that the variation of the mutual balance with external factors, such as temperature and pressure, is much larger for the short arrays, resulting in a larger error specification for the short arrays.

In theory, the required positions of the receiver coils can be calculated with high precision, even when the transmitter is a finite-size solenoid. In practice, all geometrical parameters, such as the positions ($Z_{buck}$ and $Z_{main}$) and the radii ($r_{trans}$, $r_{buck}$, and $r_{main}$) of the coils, have finite ranges of variations. The direct mutual couplings T–$R_1$ and T–$R_2$ are very sensitive to even minute changes in some of the geometrical parameters, and, therefore, large variations in measured signals may result from small errors or variations in, for example, the radii of the coils. Therefore, when an EM tool is manufactured, the configuration of the coils may need to be further adjusted from the calculated configuration. In a practical configuration, both positions of the bucking coil and the main coil ($Z_{buck}$ and $Z_{main}$) relative to the position of the transmitter (z=0) would need to be carefully adjusted with a high degree of precision in order to minimize direct mutual couplings. Such balancing or adjusting could be very difficult and demanding.

One prior art method of fine-tuning the antenna is to use moveable coils so that the locations of the coils (e.g., the main or bucking coils) may be altered to minimize the direct coupling. For example, if the direct coupling (reflected as residual $\sigma_X$) for a particular array is substantial, it can be minimized (or reduced to zero) by altering the location of an antenna, such as the bucking coil $Z_{buck}$. However, as a practical matter, it is preferred that the tool or antenna has no moving parts.

An alternative method for fine tuning the antenna is to add a conductive loop near one of the coils (e.g., the receiver coil) to permit fine adjustment. Another approach is to adjust with the number of turns in the bucking coil. However, this approach is often impractical because removing or adding a single turn in a coil may produce large changes in $\sigma_X$. This is especially true when the distance between the bucking coil and the transmitter coil is short. Therefore, there still exists a need for new approaches to balancing induction arrays.

SUMMARY OF THE INVENTION

One aspect of the invention relates to electromagnetic logging tools. An electromagnetic logging tool in accordance with one embodiment of the invention includes a support configured for disposal in a well; at least one antenna mounted on the support; and a plurality of coils mounted on the support proximate the at least one antenna, wherein the plurality of the coils are configured for selective connection with the at least one antenna.

In another aspect, embodiments of the invention relate to methods for balancing an induction array on an electromagnetic logging tool. A method in accordance with one embodiment of the invention includes measuring a mutual coupling between a transmitter and a receiver on the electromagnetic logging tool; and selectively connecting a subset of a plurality of coils on the electromagnetic logging tool to the transmitter or the receiver based on the measured mutual coupling.

Another aspect of the invention relates to methods for manufacturing an electromagnetic logging tool. A method in accordance with one embodiment of the invention includes machining a winding window on a support; disposing an antenna in the winding window; machining a plurality of slots on the support for disposing a plurality of coils; and disposing the plurality of coils in the plurality of slots, wherein the plurality of coils are configured to be selectively connected to the antenna.

Other aspects and advantages of the invention will become apparent from the following description and the attached claims.

DETAILED DESCRIPTION

In one aspect, the present invention relates to methods and apparatus for balancing an induction coil array. In accordance with embodiments of the present invention, a set of selectable, individual coil windings, referred to as the Selectable Tap Induction Coil (STIC), is used. The multiple windings of an STIC can be selectably inter-connected and connected to other coils, e.g. to a receiver or a transmitter. An STIC can remove unwanted direct coupling (as reflected in $\sigma_X$) between the transmitter and the receiver coils in an induction array and is particularly useful when the array is a fixed-coil array, in which all coils are located in pre-determined positions that cannot be changed.

Figure 1:
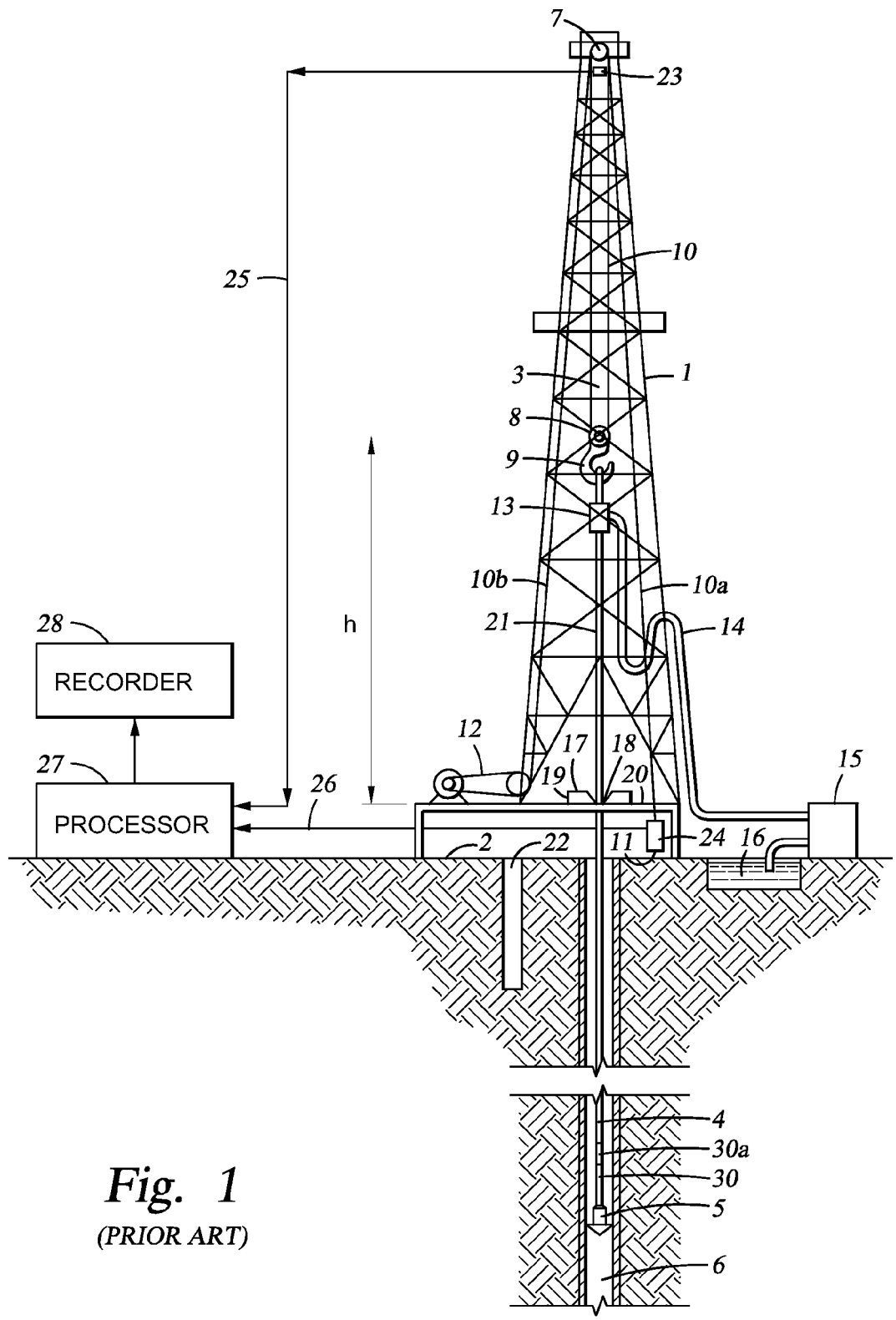
FIG. 1 illustrates a conventional drilling rig and a drill string with a downhole logging tool in a borehole.
Figure 2:
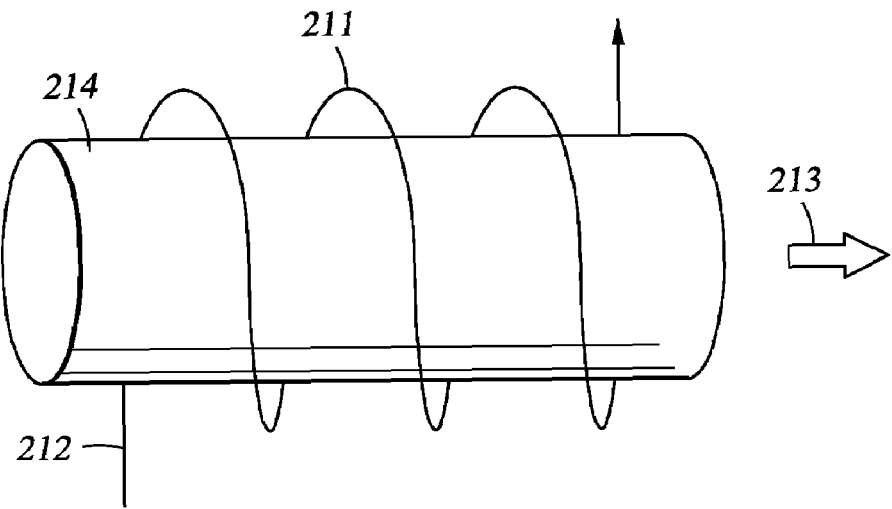
FIG. 2 shows a structure of an induction coil.
Figure 3:
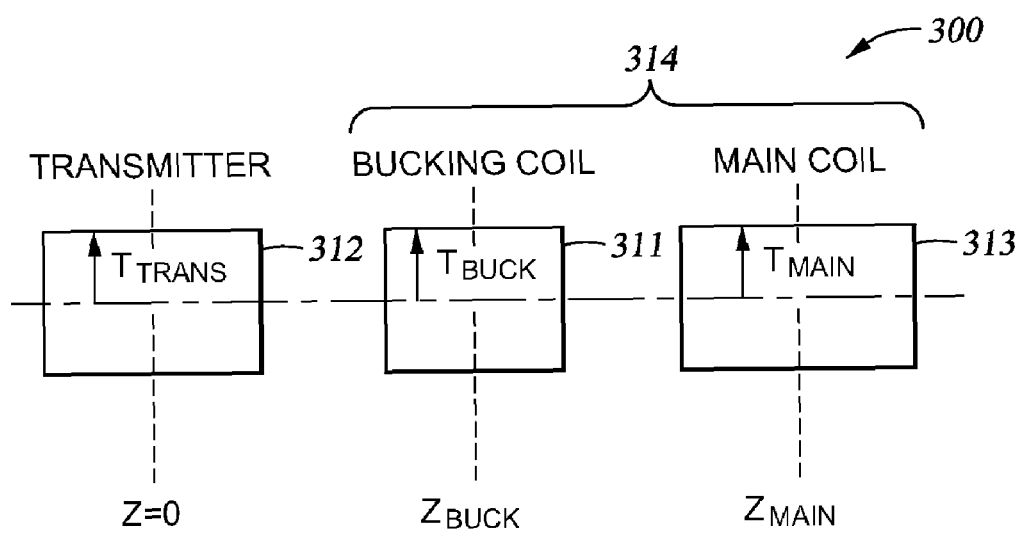
FIG. 3 illustrates a prior art three-coil transmitter-receiver array.
Figure 4:
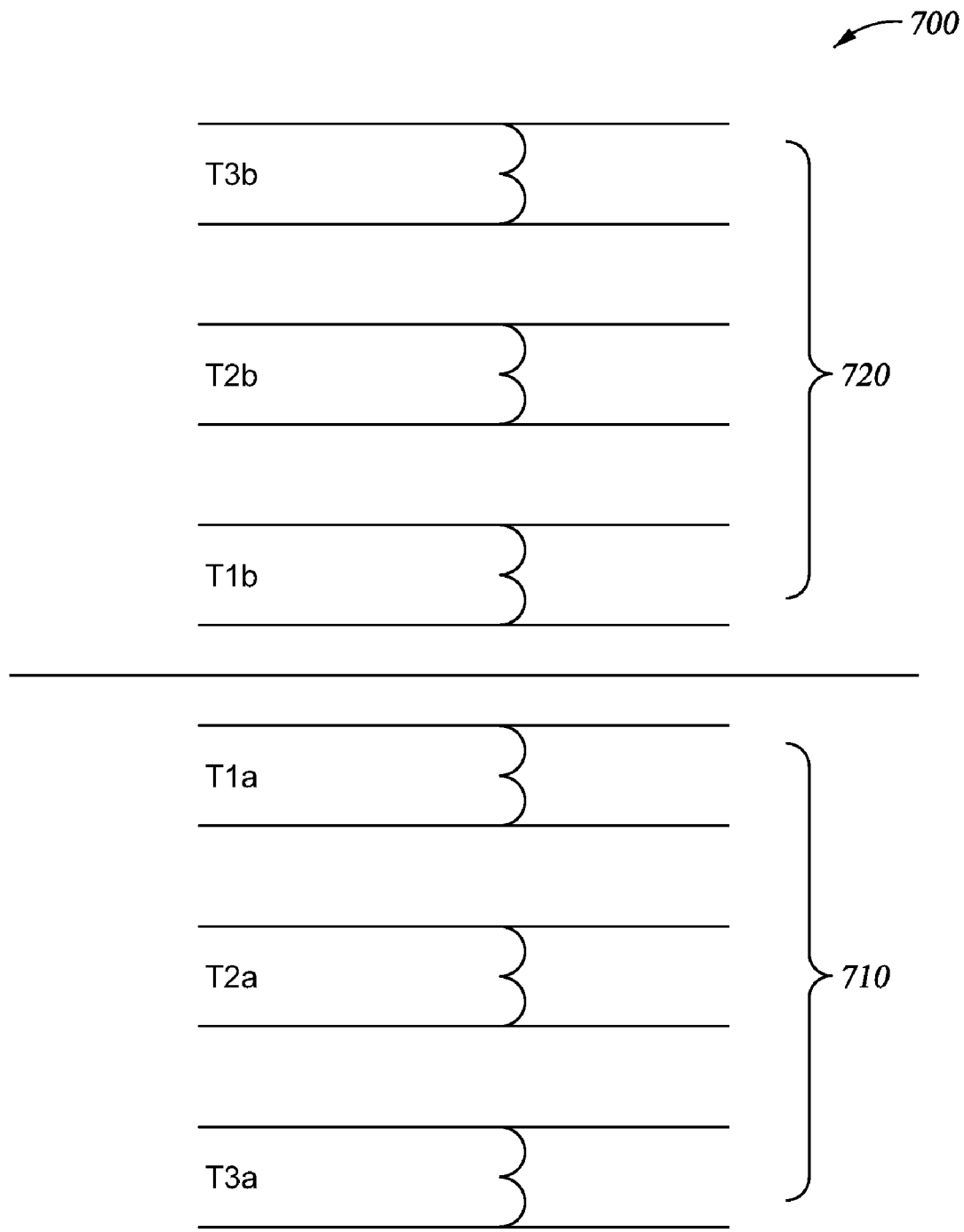
FIG. 4 shows a schematic of a selectable tap induction coil in accordance with embodiments of the present invention.

Referring to FIG. 4, in accordance with one embodiments of the present invention, an STIC 700 may include two sets of balancing coils (taps) 710 and 720. Each set includes, for example, three different balancing coils (taps), T1a, T2a, T3a, and T1b, T2b, T3b, respectively. One of ordinary skill in the art would appreciate that the number of coils in each set may be different from three, and the number of sets may be different from two. Both the set number and the coil number can be any desired number.

In the example shown in FIG. 4, each of the three balancing coils can be independently selected and connected to an antenna. Alternatively, these balancing coils may be interconnected (for example, using jumpers) before connecting to the antenna. Interconnection of these coils in effect produces a different number of turns of the conductive wire for the interconnected subset of coils. By selectively connecting an individual coil or a subset of the coils to an antenna (a transmitter or a receiver), the antenna's "effective" magnetic moment can be modified, and a balanced array may be achieved.

The antenna may be a transmitter or a receiver, and the selectively connected balancing coils in effect become part of the transmitter coil or part of the receiver coil (main or bucking coil). The "subset" of a plurality of coils is defined hereinafter as any combination of the plurality of coils. For example, depending on the balancing needed, each of the six coils in FIG. 4 may be separately connected to the antenna, or a combination of T1$a$+T2$a$, T1$b$+T2$b$, T1$a$+T3$b$, T1$a$+T2$a$+T3$a$, . . . , or all of the coils, may be interconnected first and then connected to the antenna. No change of coil locations is necessary in these operations.

In accordance with embodiments of the invention, after the induction antenna coils (the transmitter, the receiver main coil and the first bucking coil) are wound, the mutual couplings are measured. Theoretically, for integer values of $N_{main}$ and $N_{buck}$, it is possible to find $L_{main}$ and $L_{buck}$ to satisfy the condition in Equation (3) with any precision. However, in practice, the sum of the two terms on the left-hand side of Equation (3) will be non-zero due to finite tolerance. Let's assume the experimentally determined mutual coupling is $\Delta_{exp}$:

$$\left[\frac{N_{main}}{L_{main}^3} + \frac{N_{buck}}{L_{buck}^3}\right]_{exp} = \Delta_{exp}.$$

The residual mutual couplings may be reduced close to zero by using selectable tap induction coils (STIC) in such a way that $N_{STIC}/L_{STIC}^3 = -\Delta_{exp}$ (or as close to $-\Delta_{exp}$ as possible), wherein $N_{STIC}$ is the number of turns and $L_{STIC}$ is the transmitter-STIC spacing. Therefore, we get:

$$\left[\frac{N_{main}}{L_{main}^3} + \frac{N_{buck}}{L_{buck}^3} + \frac{N_{STIC}}{L_{STIC}^3}\right]_{exp} = 0.$$

Figure 5:
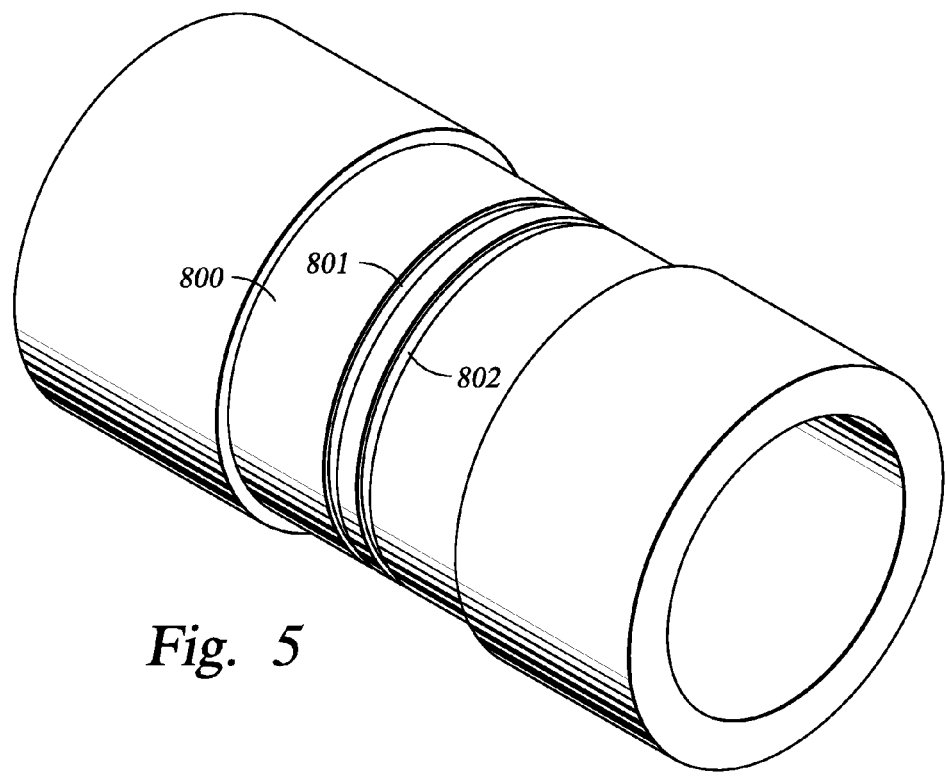
FIGS. 5-11 illustrate procedures for manufacturing a selectable tap induction coil in accordance with embodiments of the present invention.

Procedures of manufacturing an STIC in accordance with embodiments of the present invention are illustrated in FIGS. 5-12. Referring to FIG. 5, winding windows 801 and 802 of certain widths, diameters, and positions are machined to specifications on a support 800, on which induction coils are to be wound. The dimensions of the winding windows are typically designed based on the desired transmitter and receiver parameters. The support 800 preferable are made of non-conductive materials with low thermal expansion coefficients, such as composite materials or ceramics. A particular composite or ceramic support material may be chosen according to its material properties, such as the Coefficient of Thermal Expansion (CTE), the mechanical yield strength, and the cost. Preferably, the CTE of the substrate material chosen is sufficiently small such that when temperature changes in the borehole environment the thermal expansion of the support does not substantially affect the geometries of the attached induction coils.

Figure 6:
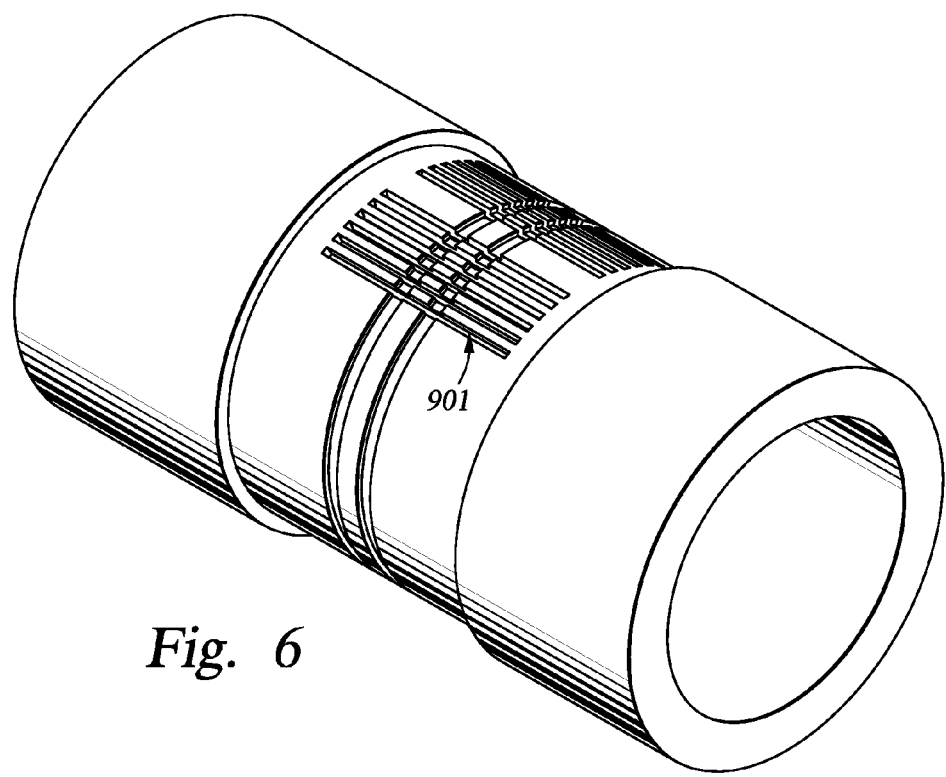
Figure 7:
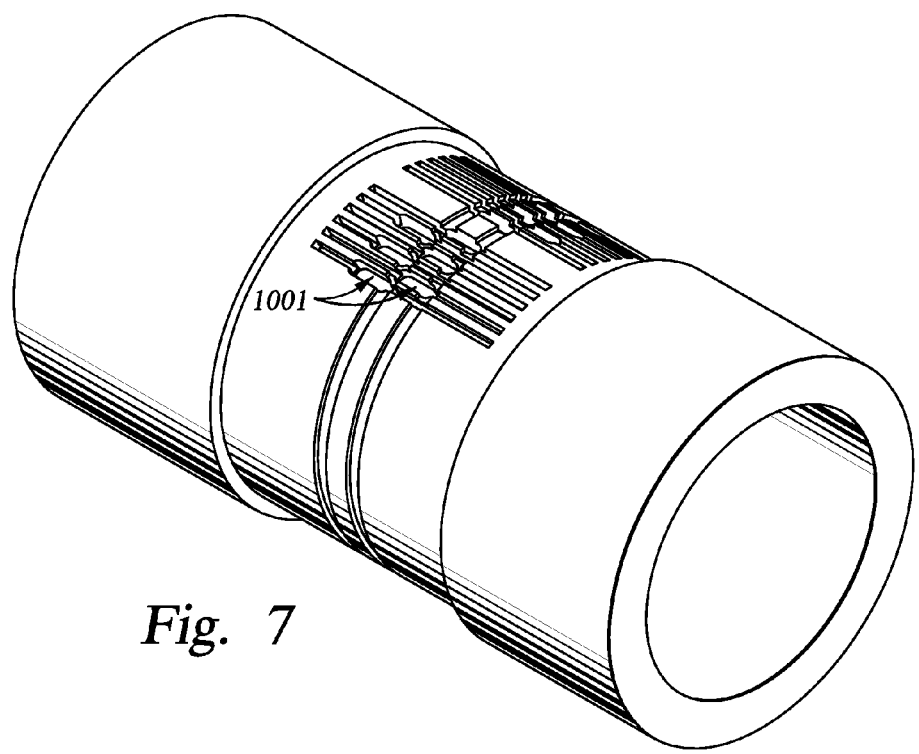
Figure 8:
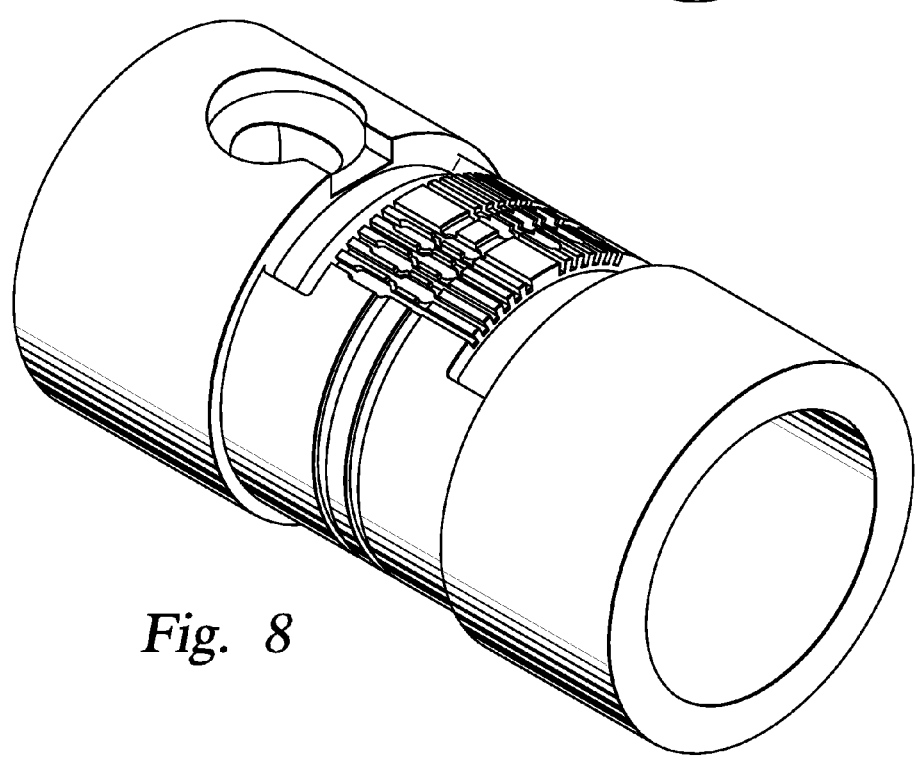
Figure 9:
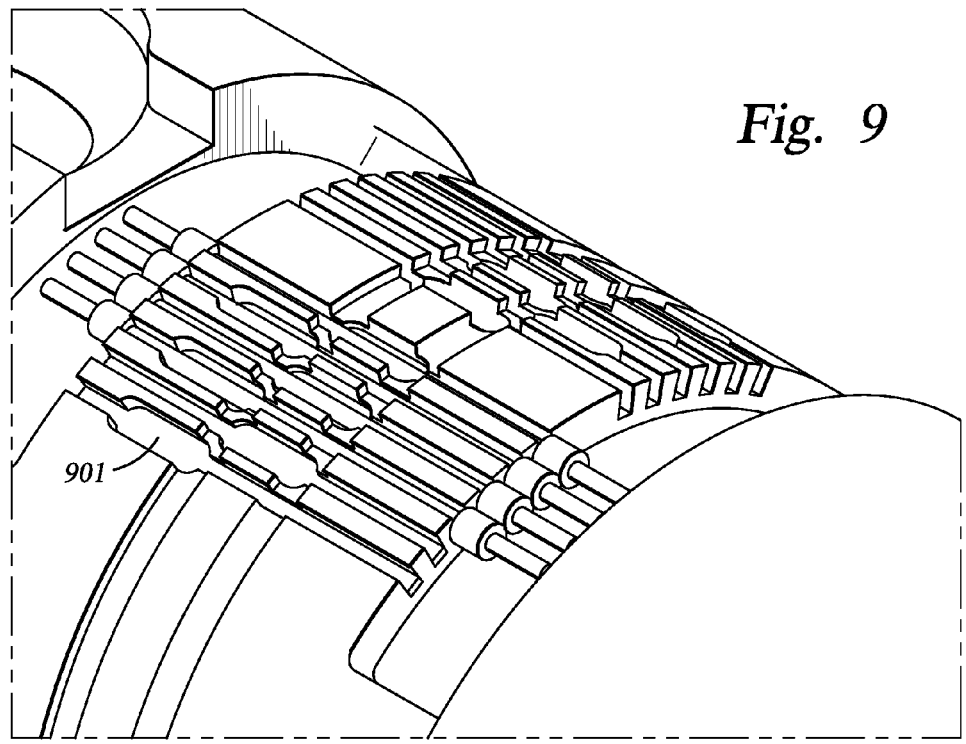
Figure 10:
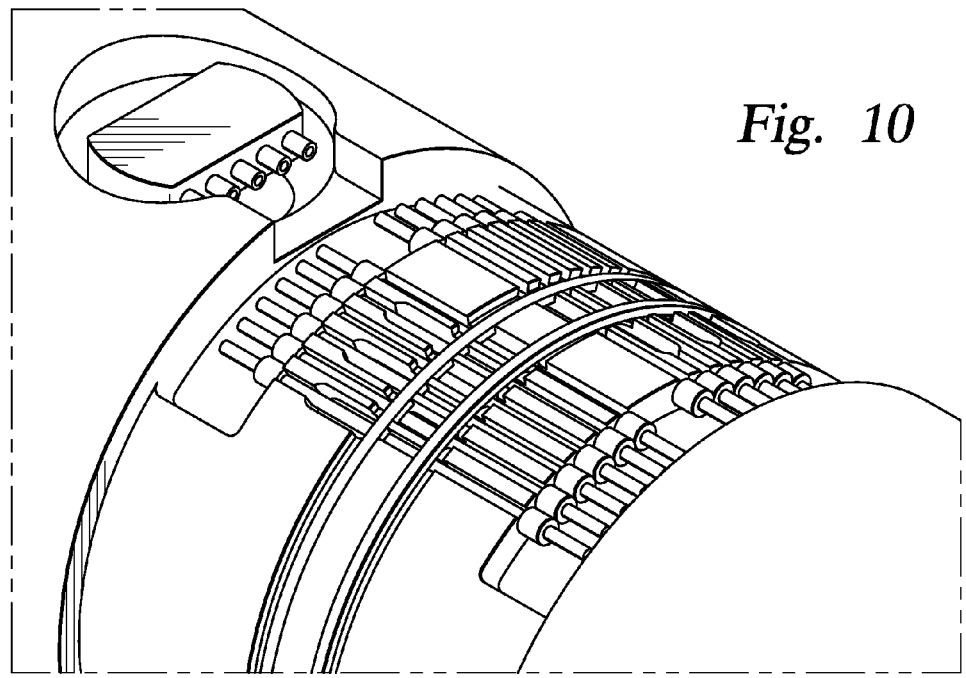

A slot 901 for connecting pins is machined to specification, as shown in FIG. 6, followed by machining of coil pockets 1001 as shown in FIG. 7. The coil pockets 1001 are used as connecting points for wires. Other structures related to the connection of the coil to the array are machined, as shown in FIG. 8. Pins may be then secured in the slots 901, for example, using a non-conductive material (e.g., epoxy), as shown in FIG. 9. Each coil is wound with a desired number of turns for each selectable tap and may be connected to a pair of pins to facilitate connections, as shown in FIG. 10. The number of turns in each coil may be determined by the amount of balancing desired.

Figure 11:
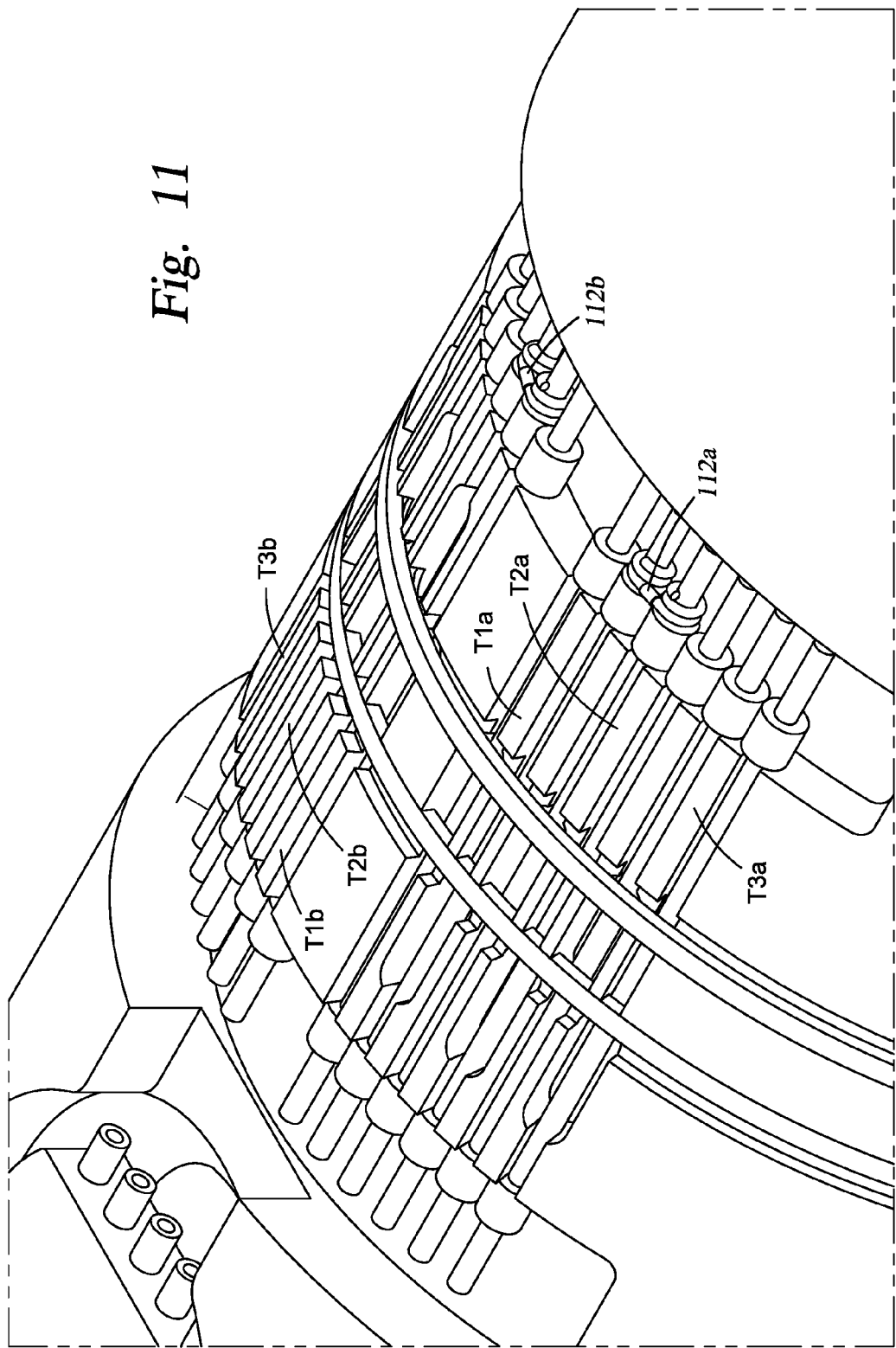
Figure 12:
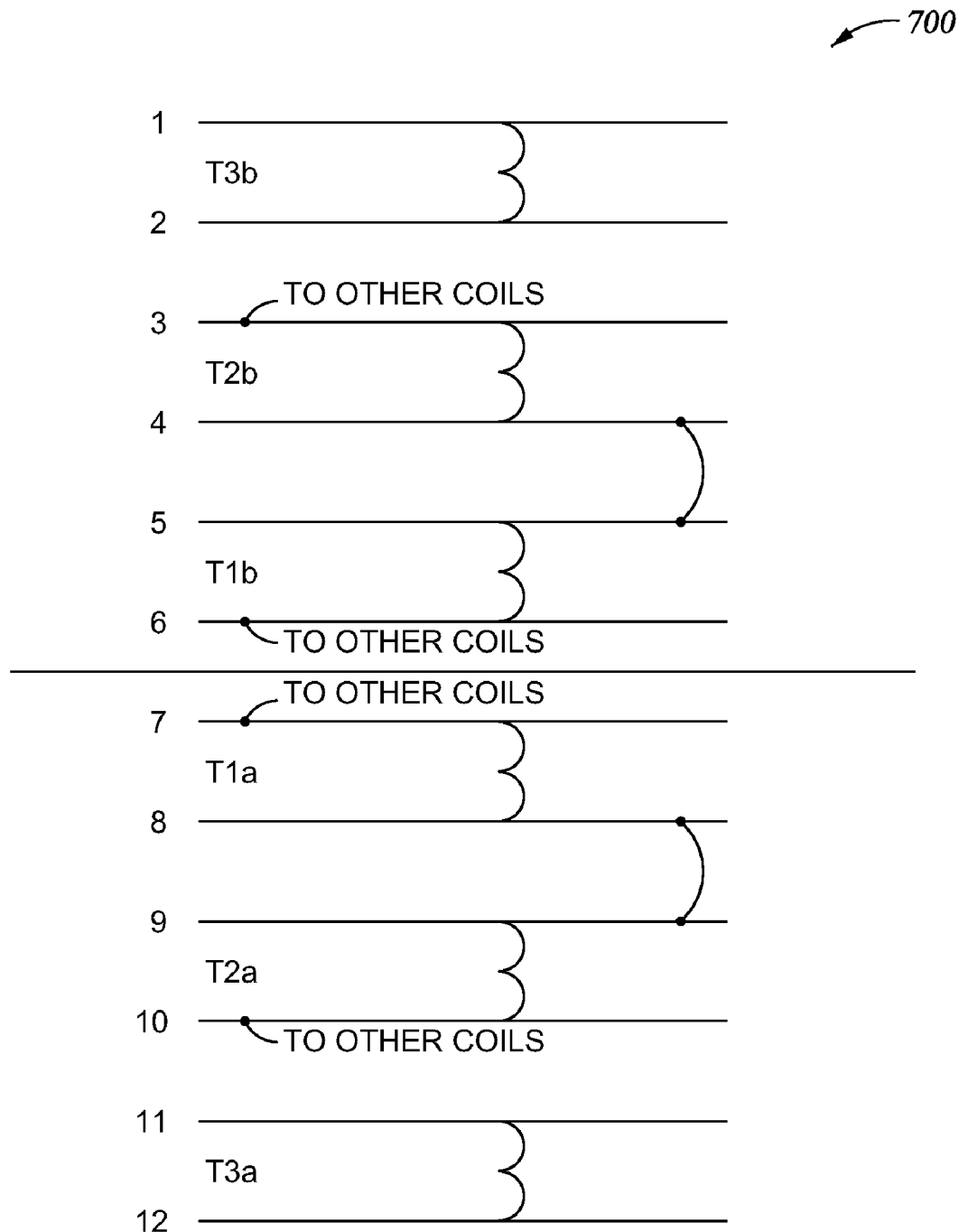
FIG. 12 shows a schematic of the specific tap selection and coil connection illustrated in FIG. 11 in accordance with an embodiment of the present invention.

After making an initial measurement of the mutual coupling (as reflected in $\sigma_X$) using the tool electronics, the taps are selected and inter-connected by installing appropriate jumpers, as shown in FIG. 11. Note that while this example uses jumpers to connect the coils, one skilled in the art would appreciate that other mechanisms (such as switches or toggles) may be used to connect the coils without departing from the scope of the invention. In the specific example shown in FIG. 11, windings T1$a$ and T2$a$ are inter-connected in series using a jumper 112$a$, and windings T1$b$ and T2$b$ are inter-connected in series using a jumper 112$b$. The resulting effective numbers of turns are that of T1$a$+T2$a$, and that of T1$b$+T2$b$, respectively. The schematics of this specific selection is illustrated in FIG. 12.

Figure 13:
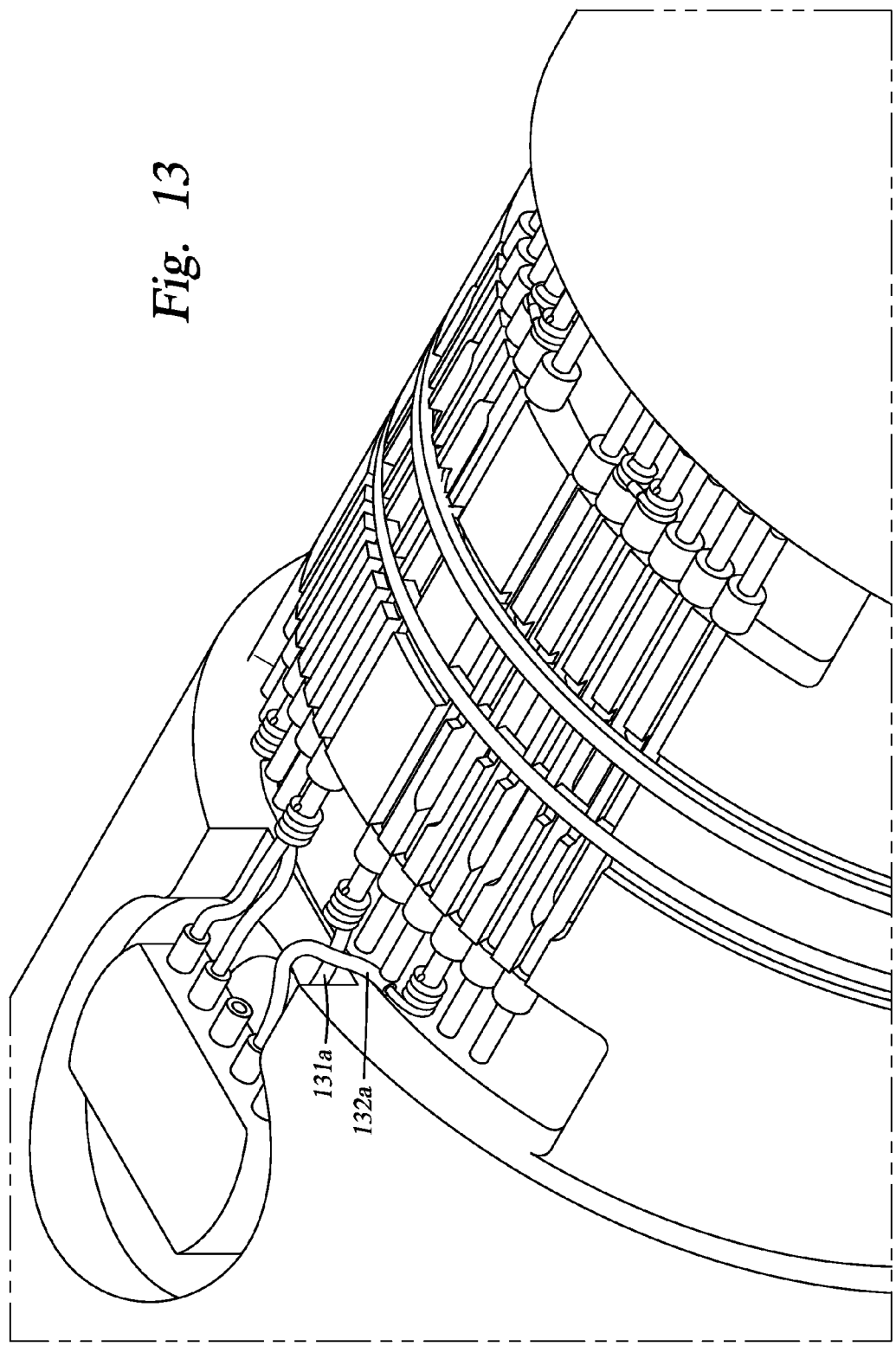
FIG. 13 shows the connections between the selectable tap induction coils and an antenna.

The selected, inter-connected coil windings T1$a$ and T2$a$ may be then connected to a transmitter or receiver antenna with a pair of wires 131$a$ and 132$a$, as shown in FIG. 13. Similarly, the inter-connected coil windings T1$b$ and T2$b$ may be connected to a receiver or a transmitter. After the selected coils are connected to the receiver or the transmitter, another measurement is made to verify that the array is balanced. The measurement-selection-measurement procedure may be repeated until the best balancing is achieved or meets a selected criterion.

Figure 14:
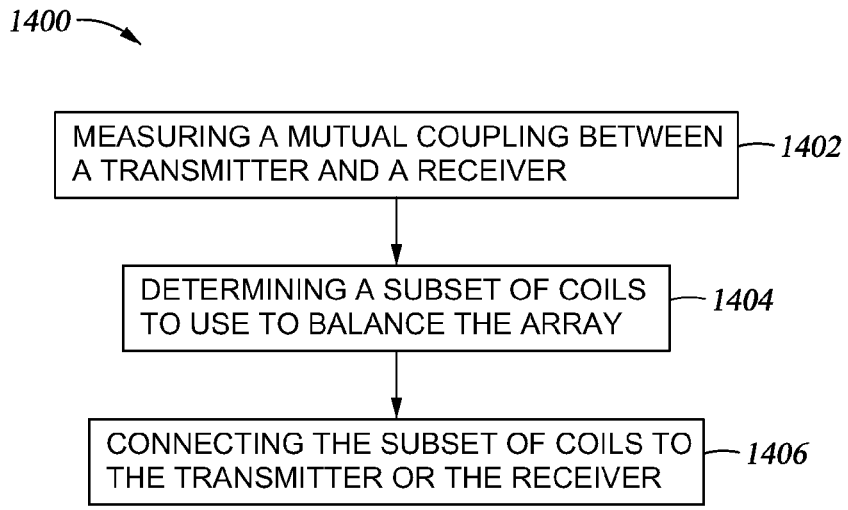
FIG. 14 shows a method for balancing an inductive array in accordance with one embodiment of the invention.
Figure 15:
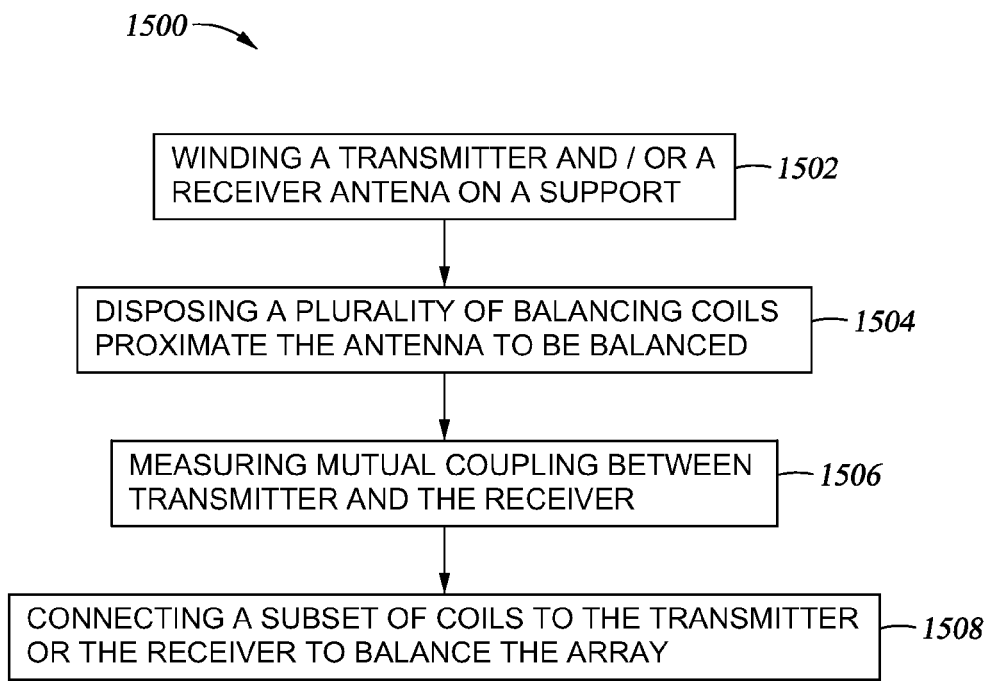
FIG. 15 show a method for manufacturing an EM tool in accordance with one embodiment of the invention.

FIG. 14 shows a flow chart summarizing a method for balancing an EM tool that includes a plurality of balancing coils in accordance with one embodiment of the invention. As shown, a method 1400 first measures a mutual coupling between a transmitter and a receiver (step 1402). As noted above, this can be done after the tool is manufactured using the electronics on the tool. Then, a subset of coils needed to balance the array is determined based on the measurement (step 1404). The selected subset of coils are then connected to either the transmitter or the receiver (step 1406). As noted above, the subset of coils may be interconnected using, for example, jumpers, and the subset is then connected to the transmitter or receiver using a conductive wire. One of ordinary skill in the art would appreciate that other mechanisms for such connections may also be use. Afterwards, a second measurement of mutual coupling may be made and adjustment FIG. 15 shows a flow chart summarizing a method for manufacturing an EM tool that includes a plurality of balancing coils in accordance with one embodiment of the invention. As shown, a method 1500 involves winding at least one antenna on a support (step 1502). The at least one antenna may be a transmitter or a receiver. One of ordinary skill in the art would appreciate that the terminology of transmitter and receiver is used for clarity of description only, because a coil may be used as a transmitter or a receiver depending on the particular application. Furthermore, a support (or a section of the tool) may include only one antenna or more than one antennas that form one or more arrays (such as the array induction tool, AIT®, from Schlumberger Technology Corporation). If the section includes only one antenna, another antenna on a different section may be included to form an array.

A plurality of balancing coils is included on the support proximate the antenna to be balanced (step 1504). Note that it is preferred that the balancing coils be close to the antenna to be balanced. However, this is not a requirement. As noted above, the plurality of balancing coils should be configured such that they can be individually connected to the antenna, or they can be interconnected and then connected to the antenna.

Next, the mutual coupling between a transmitter and a receiver may be measured (step 1506). Again, this may be accomplished with the electronics on the tool. Based on the mutual coupling, a subset of coils is selected for balancing. Then, the subset of coils is connected to either the transmitter or the receiver antenna (step 1508). If necessary, the mutual coupling may be measured again and further adjustment of the coils is made to reduce the mutual coupling to within a selected criterion. Note that the balancing (steps 1506 & 1508) may be performed by the tool manufacturer before the tool is shipped or on site before use.

Advantages of the present invention include one or more of the following. Embodiments of the invention provide convenient methods to adjust the "effective" number of turns and/or the "effective" position of a receiver or a transmitter coil. Embodiments of the invention do not rely on moving parts and require less time to balance an array. Thus, a tool in accordance with embodiments of the invention may be manufactured with lower costs. In addition, embodiments of the invention can be used in a wide-range of induction tools, including wireline, LWD, MWD, or LWT tools.

What is claimed is:

1. An electromagnetic logging tool, comprising:
   a support configured for disposal in a well;
   at least one antenna mounted on the support; and
   a plurality of coils mounted on the support proximate the at least one antenna, wherein the plurality of the coils are configured for selective connection with the at least one antenna, and wherein selected ones the plurality of coils resulting in a measured mutual inductance being minimized are directly wire connected at one terminal end to the at least one antenna and directly wire connected at another terminal end to a transmitter or a receiver.

2. The electromagnetic logging tool of claim 1, wherein the support is made of a non-conductive material.

3. The electromagnetic logging tool of claim 1, wherein the support member is made of at least one material selected from a ceramic material and a composite material.

4. The electromagnetic logging tool of claim 1, wherein the plurality of coils are secured on the support using a non-conductive material.

5. An electromagnetic well logging instrument, comprising:
   a support configured for disposal in a well;
   at least one antenna mounted on the support;
   a plurality of coils mounted on the support proximate the at least one antenna; and
   means for making direct wired electrical connection between selected ones of the plurality of the coils at one terminal end thereof and the at least one antenna, and direct wired electrical connection at another terminal end thereof to a transmitter or receiver resulting in a minimum measured mutual induction between the at least one antenna and the wire connected ones of the coils, and at least one additional antenna disposed on the support.

6. The electromagnetic logging tool of claim 5, wherein the support is made of a non-conductive material.

7. The electromagnetic logging tool of claim 5, wherein the support member is made of at least one material selected from a ceramic material and a composite material.

8. The electromagnetic logging tool of claim 5, wherein the plurality of coils are secured on the support using a non-conductive material.

9. The electromagnetic logging tool of claim 5, wherein the means for mechanically making electrical connection comprises a wire jumper.

* * * * *